United States Patent [19]

Nguyen et al.

[11] Patent Number: 5,657,214

[45] Date of Patent: Aug. 12, 1997

[54] STEPPED WAVEFORM PWM INVERTER

[75] Inventors: Vietson Nguyen; P. John Dhyanchand, both of Rockford, Ill.

[73] Assignee: Sundstrand Corporation, Rockford, Ill.

[21] Appl. No.: 709,118

[22] Filed: Jun. 3, 1991

[51] Int. Cl.$^6$ ............................................. H02M 1/12
[52] U.S. Cl. ................... 363/41; 363/43; 363/71; 363/90; 363/132
[58] Field of Search ..................... 363/41, 43, 71, 363/98, 132

[56] References Cited

U.S. PATENT DOCUMENTS

| Re. 29,560 | 2/1978 | Frank et al. | 363/71 |
|---|---|---|---|
| 3,614,590 | 10/1971 | Kernick | 321/9 |
| 3,638,094 | 1/1972 | Ve Nard | 363/43 |
| 3,775,662 | 11/1973 | Compoly et al. | 363/43 |
| 3,979,662 | 9/1976 | Klein | 363/41 |
| 4,063,143 | 12/1977 | Forstbauer | 363/40 |
| 4,204,264 | 5/1980 | Lipman | 363/71 |
| 4,698,739 | 10/1987 | Paice | 363/71 |
| 4,975,822 | 12/1990 | Lipman | 363/43 |
| 5,008,797 | 4/1991 | Patel et al. | 363/43 |
| 5,027,265 | 6/1991 | Dhyanchand et al. | 363/71 |
| 5,031,086 | 7/1991 | Dhyanchand et al. | 363/71 |
| 5,036,451 | 7/1991 | Rozman et al. | 363/98 |
| 5,040,105 | 8/1991 | Dhyanchand et al. | 363/43 |
| 5,041,957 | 8/1991 | Dhyanchand et al. | 363/71 |
| 5,041,958 | 8/1991 | Dhyanchand et al. | 363/71 |

FOREIGN PATENT DOCUMENTS

| 54-10923 | 1/1979 | Japan . |
|---|---|---|
| 504282 | 3/1976 | U.S.S.R. . |
| 1170570 | 7/1985 | U.S.S.R. . |

*Primary Examiner*—David C. Cain
*Attorney, Agent, or Firm*—Marshall, O'Toole, Gerstein, Murray & Borun

[57] ABSTRACT

An inverter for converting DC power into AC power includes first and second subinverters having a plurality of controllable switches and three-phase outputs coupled to a summing transformer having wye and delta connected sets of primary windings and a set of secondary windings. The switches in the subinverters are controlled so that the subinverters produce first and second sets of pulse-width modulated subinverter waveforms which are summed by the summing transformer to produce the AC power in the secondary winding.

15 Claims, 7 Drawing Sheets

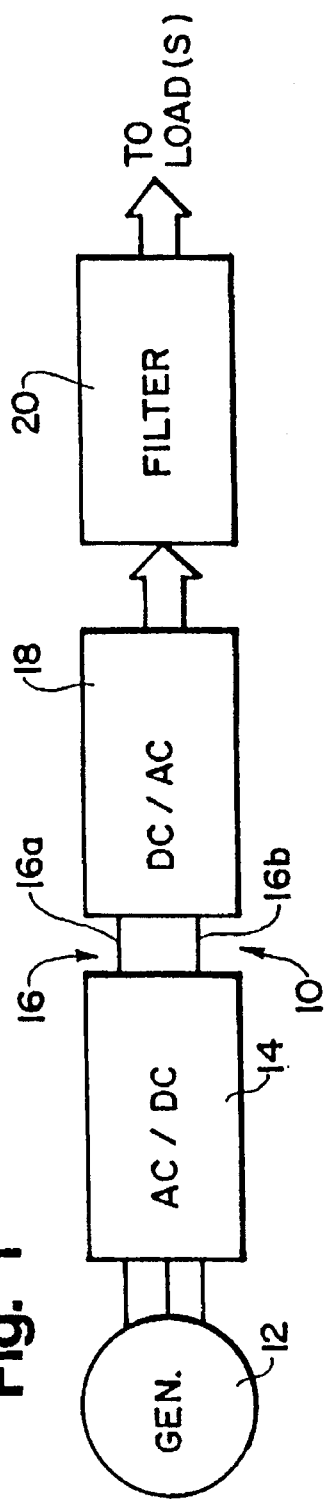
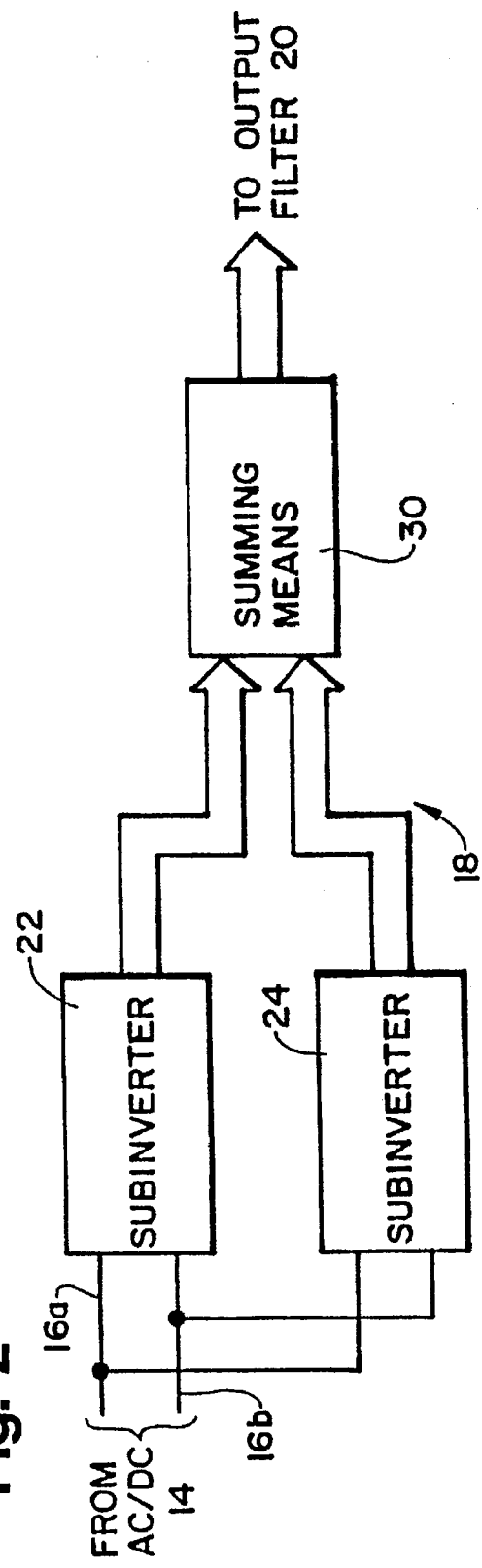

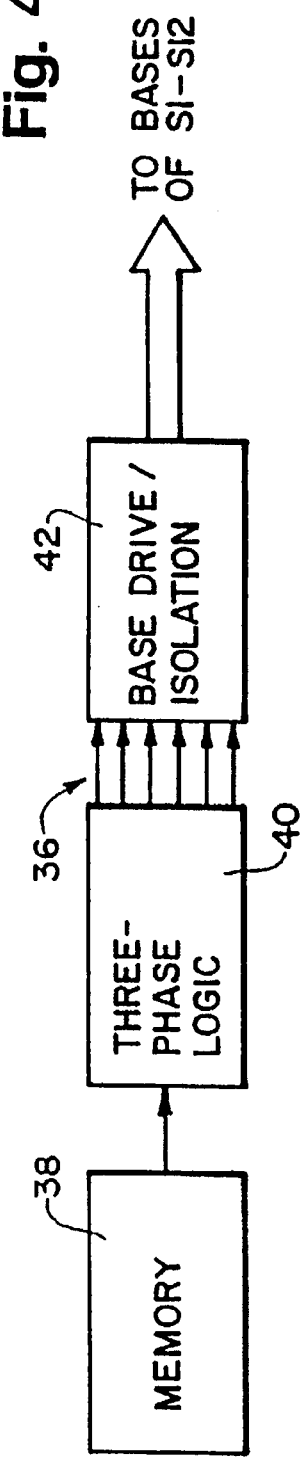
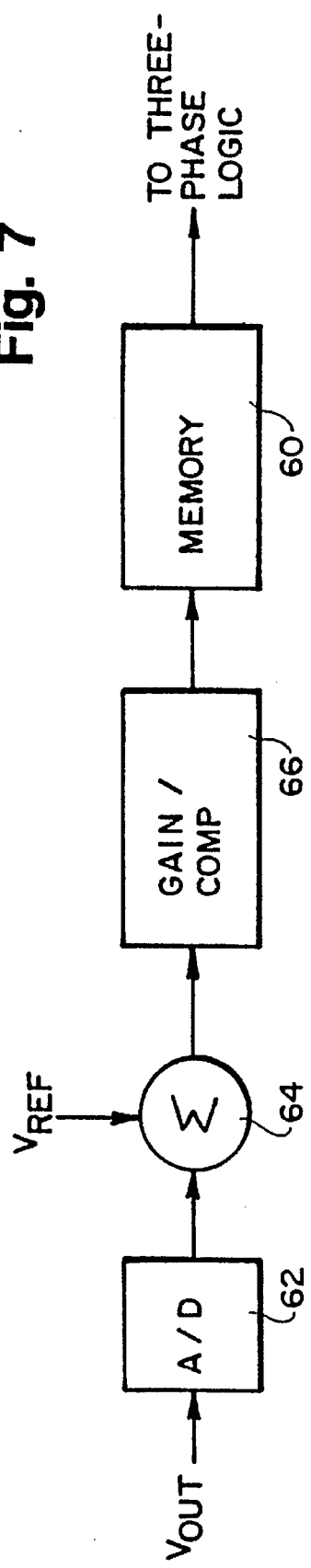

STEPPED WAVEFORM PWM INVERTER

TECHNICAL FIELD

The present invention relates generally to power converters, and more particularly to an inverter for converting DC power into AC power.

BACKGROUND ART

Inverters are often used in variable-speed, constant-frequency power generating systems to convert DC power produced by a brushless, synchronous generator and a rectifier bridge into AC power for energizing one more AC loads. A pulse-width modulated (PWM) inverter for producing three-phase AC power typically includes six controllable power switches connected in a bridge configuration. The switches are operated by PWM operating waveforms to produce a set of three PWM output voltages at junctions between the power switches. The output voltages switch between three voltage levels, i.e. zero volts, a positive voltage and a negative voltage, to produce a PWM waveform having a substantial fundamental component and higher harmonic components. Regulation of the output power produced by the inverter can be effected by sensing a parameter of the output power and selecting PWM switch operating waveforms in dependence upon the sensed parameter to in turn cause a selected parameter to approach a regulated value.

Stepped waveform inverters utilize a plurality of subinverter bridges coupled to a summing transformer. In a specific type of stepped waveform inverter, three-phase outputs of four subinverters are coupled to respective three-phase primary windings of the summing transformer. The windings of two of the sets of primary windings are connected in a wye configuration while the windings of the remaining sets of primary windings are connected in a delta configuration. The summing transformer further includes a set of three-phase secondary windings which are magnetically linked to the sets of primary windings. In operation, rectangular voltage waveforms are supplied to the primary windings by the subinverters to in turn produce a set of three-phase summed output voltages in the secondary winding. The output voltages comprise 24-step waveforms having a substantial fundamental component and higher harmonic components.

Each of the PWM and stepped waveform inverters has advantages and disadvantages. The PWM inverter requires only six power switches to produce a usable high power output. As a result, a relatively simple control unit may be employed to operate the switches and cooling requirements are minimized. However, the PWM inverter generates harmonics of sufficient amplitude to require the use of a large and heavy filter. This filter undesirably increases the size and weight of the overall inverter system and may render the system unsuitable for certain applications where size and weight must be minimized, such as in aircraft.

In addition to the foregoing, the number of switch transitions per cycle is occasionally high enough to cause power dissipation to increase unacceptably. Further, the inverter occasionally operates in an unreliable fashion when the number of switch transitions per cycle becomes too high.

The stepped waveform inverter generates substantially lower magnitudes Of harmonic content than the PWM inverter, and hence the filter size and weight are greatly reduced as compared therewith. Also, isolation between input and output is accomplished by the summing transformer and hence a separate isolation transformer is not required for those applications where isolation is needed. Further, EMI is reduced by the transformer. However, while the switches of the stepped waveform inverter can be lower power devices that are relatively inexpensive and readily available, a substantially greater number of power switches must be used as compared with the PWM inverter, and hence gate drive complexity and packaging requirements are increased. Further, the summing transformer size-and weight are not negligible, in turn partially offsetting the decreased size and weight of the filter.

The stepped waveform inverter has the further disadvantage in that the same number of switches must be used regardless of the output power level produced thereby.

Klein, U.S. Pat. No. 3,979,662 discloses an inverter system wherein the outputs of first and second inverters are coupled by first and second transformers, respectively, to a common load. More specifically, three-phase outputs of the first inverter are coupled to a set of wye-connected three-phase primary windings of the first transformer. Similarly, three-phase outputs of the second inverter are coupled to a set of wye-connected three-phase windings of a second transformer. The first transformer includes a set of three-phase secondary windings whereas the second transformer includes a set of three-phase secondary windings and a set of three-phase tertiary windings. The phase A primary winding of the first transformer is connected by the phase B secondary winding of the first transformer, the phase A secondary winding of the second transformer and the phase C tertiary winding of the second transformer to the load. In like fashion, the phase B primary winding of the first transformer is connected by the phase C secondary winding of the first transformer, the phase B secondary winding of the second transformer and the phase A tertiary winding of the second transformer to phase B of the load. Further, the phase C primary winding of the first transformer is connected by the phase A secondary winding of the first transformer, the phase C secondary winding of the second transformer and the phase B tertiary winding of the second transformer to phase C of the load. The inverters are operated to produce pulse-width modulated waveforms which are vectorially added by the transformers to produce stepped waveforms having pulse-width modulated notches therein.

Paice, U.S. Pat. No. 4,698,739 discloses a motor drive wherein the outputs of first and second inverters are coupled to primary and secondary windings of a transformer. The inverters are operated to produce a stepped waveform in the inverter output.

SUMMARY OF THE INVENTION

In accordance with the present invention, an inverter for converting DC power into AC power produces an output having low distortion and is simple to control.

More particularly, an inverter for converting DC power into AC power includes first and second subinverters each having a plurality of controllable switches and three-phase outputs and a summing transformer having first and second sets of three-phase windings and a set of three-phase secondary windings. The first set of primary windings is connected in a wye configuration and includes three inputs coupled to the three-phase outputs of the first subinverter and the second set of primary windings is connected in a delta configuration and includes three inputs coupled to the three-phase outputs of the second subinverter. Means are coupled to the first and second subinverters for controlling the controllable switches such that the first and second subinverters produce first and second sets of three-phase pulse-width modulated (PWM) subinverter waveforms which are summed by the summing transformer to produce the AC power in the secondary winding.

If desired, the summing transformer may further include third and fourth sets of three-phase primary windings and the inverter may further include third and fourth subinverters each having three-phase outputs coupled to the third and fourth sets of primary windings. The third and fourth subinverters produce third and fourth sets of three-phase PWM subinverter waveforms which are summed with the first and second sets of three-phase PWM subinverter waveforms by the summing transformer. Preferably, the first and second sets of three-phase PWM subinverter waveforms are phase displaced relative to one another by a first fixed angle, the third and fourth sets of PWM subinverter waveforms are phase displaced relative to one another by a second fixed angle and the first and third sets of PWM subinverter waveforms are phase displaced by a variable angle.

In accordance with this aspect of the present invention, means are coupled to the set of the secondary windings for sensing an output voltage of the inverter together with means for varying the variable angle in dependence upon the sensed output voltage.

In accordance with a further aspect of the present invention, an inverter for converting DC power into AC power includes first and second subinverters each having a controllable switch and an output and means coupled to the first and second subinverters for controlling the controllable switches such that the first and second subinverters produce first and second PWM subinverter waveforms wherein the PWM subinverter waveforms are identical except the second is phase displaced relative to the first by a variable angle. Means are provided for sensing a parameter of the AC power together with means coupled to the sensing means for controlling the variable angle in dependence upon the sensed parameter. Means are coupled to the outputs of the subinverters for summing the PWM subinverter waveforms to produce the AC power. In accordance with a preferred form of this aspect of the present invention, the sensing means comprises means for detecting an output voltage of the inverter. Further, the summing means preferably comprises a summing transformer having first and second primary windings coupled to the outputs of the first and second subinverters and a secondary winding in which the AC power is produced.

In accordance with yet another aspect of the present invention, an inverter for converting DC power into AC power includes first through fourth subinverters each having a controllable switch and an output, a summing transformer having first through fourth primary windings coupled to the outputs of the first through fourth subinverters, respectively, and a secondary winding and means for producing a PWM control waveform. Means are provided for operating the switches of the subinverters in accordance with the PWM control waveform so that the first through fourth subinverters produce first through fourth PWM subinverter waveforms which are identical to one another except that the second PWM subinverter waveform is phase displaced by a first fixed angle relative to the first PWM subinverter waveform, the fourth PWM waveform is phase displaced by a second fixed angle relative to the third PWM subinverter waveform and the third PWM subinverter waveform is phase displaced by a variable angle relative to the first PWM subinverter waveform. The PWM subinverter waveforms are summed by the summing transformer to produce the AC power in the secondary winding.

In accordance with this aspect of the present invention, the inverter preferably further includes means for sensing an output voltage thereof and the operating means includes means for varying the variable angle in dependence upon the sensed voltage.

According to still another aspect of the present invention, an improvement in a method of operating a three-phase inverter for converting DC power into three-phase AC power wherein the inverter includes first and second subinverters having first and second pluralities of controllable switches, respectively, and wherein the controllable switches of each of the first and second pluralities are connected in a three-phase bridge configuration and produce first, second and third subinverter phase outputs includes the step of providing a summing transformer having first and second sets of primary windings and a set of secondary windings. Each set of windings includes first, second and third phase windings wherein the first, second and third phase windings of each set of primary windings receives the first, second and third subinverter phase outputs of one of the subinverters, respectively, and the first phase winding of the set of secondary windings sums the first subinverter phase outputs, the second phase winding of the set of secondary windings sums the second subinverter phase outputs and the third phase winding of the set of secondary windings sums the third subinverter phase outputs. The improvement further comprises the steps of producing a PWM control waveform, deriving first and second pluralities of PWM switch operating waveforms from the PWM control waveform and operating the first and second pluralities of controllable switches in the subinverters in accordance with the first and second pluralities of PWM switch operating waveforms so that the subinverter phase outputs are pulse-width modulated and are summed by the summing transformer to produce the three-phase AC power.

In accordance with a highly preferred form of the invention, the improvement further includes the step of regulating a parameter of the AC power. The regulating step preferably includes the step of controlling a parameter, such as voltage, of the DC power. More specifically, the DC voltage provided to the inverter is controlled in dependence upon the sensed output voltage of the inverter.

The switches of the subinverter are preferably operated such that the PWM output waveforms are identical but phase displaced relative to each other.

In accordance with a further embodiment of the present invention, the step of producing includes the steps of providing a memory storing multiple PWM control waveforms, sensing an output voltage produced by the inverter and selecting a particular PWM control waveform from the memory in dependence upon the sensed output voltage.

An inverter according to the present invention is small and light in weight for a given power output, produces output waveforms having relatively low distortion and provides isolation between input and output.

BRIEF DESCRIPTION OF THE DRAWINGS

FIG. 1 comprises a block diagram of a power generating system including an inverter according to the present invention;

FIG. 2 is a generalized block diagram of the inverter of the present invention;

FIG. 4 comprises a more specific block diagram of the switch controller of FIG. 3;

FIG. 7 comprises a combined simplified schematic and block diagram of an alternative embodiment of the present invention;

DESCRIPTION OF THE PREFERRED EMBODIMENTS

Figure 3:
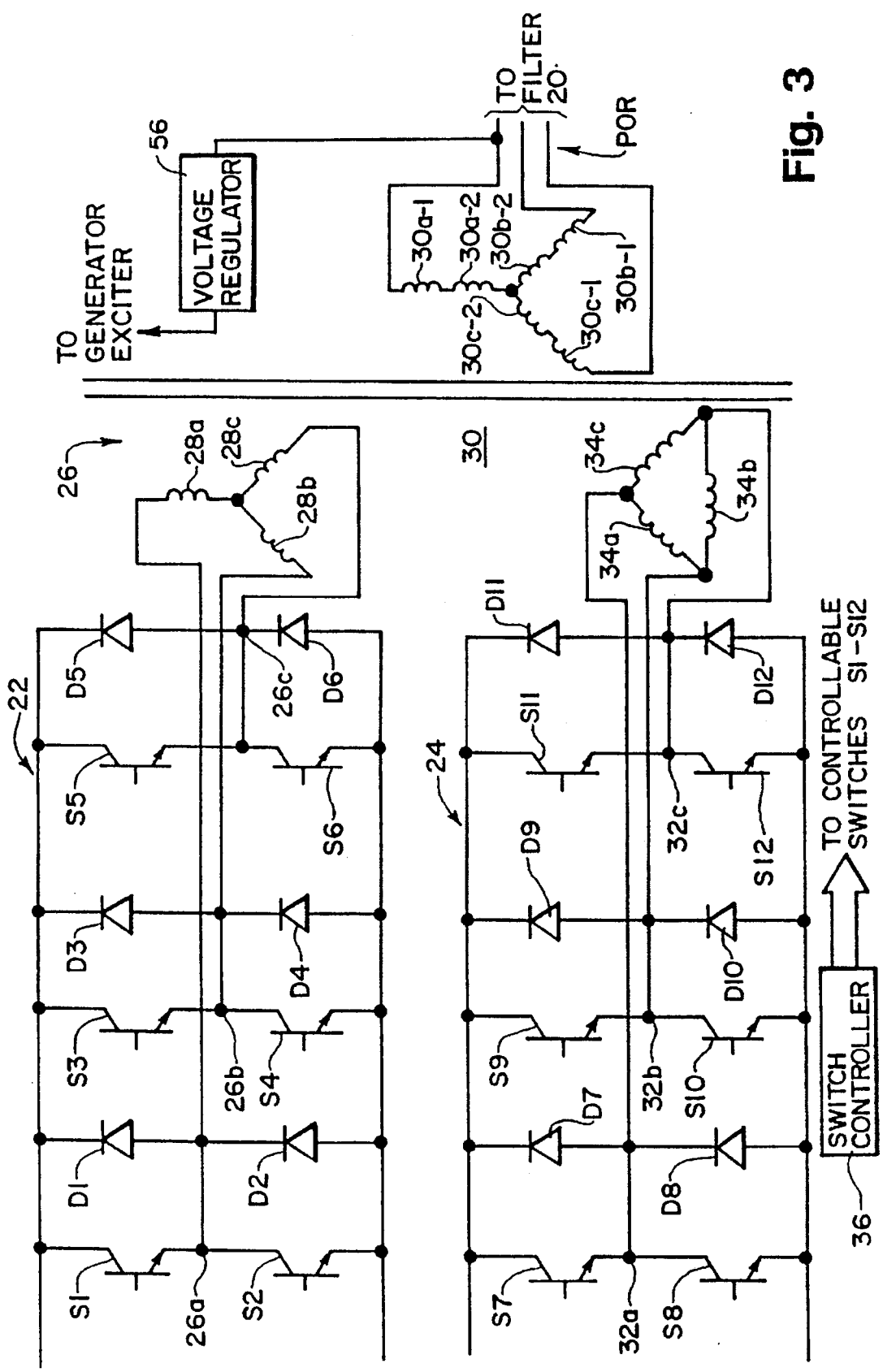
FIG. 3 comprises a combined simplified schematic and block diagram of the inverter of FIG. 2.

Referring now to FIG. 1, a power generating system 10 includes a brushless, synchronous generator 12 that develops three-phase power and an AC/DC power converter 14 that converts the polyphase AC output of the generator 12 into DC power on a DC link 16 comprising first and second DC link conductors 16a, 16b. The DC power is converted into AC power by a DC/AC converter or inverter 18 and the AC power is provided to an output filter 20. As noted in greater detail hereinafter, the inverter 18 includes a summing transformer 30 having a leakage inductance which can reduce or eliminate the need for an inductor in the output filter 20. Thus, the output filter may comprise one or more capacitors with or without one or more inductors, as required for the desired degree of filtering.

Referring now to FIG. 2, the inverter 18 includes first and second subinverters 22, 24 coupling to a summing means which, in the preferred embodiment, comprises the summing transformer 30 referred to above. As seen in FIG. 3, the subinverter 22 includes six power switches S1–S6 and six diodes D1–D6 connected in a three-phase bridge configuration to three-phase outputs 2a–26c. The three-phase outputs 26a–26c are connected to a set of three-phase primary windings 28a–28c of the summing transformer 30. The primary windings 28a–28c are connected in a wye configuration and are magnetically linked to a set of three-phase secondary windings 30a-1 through 30c-1 of the summing transformer 30.

The subinverter 24 includes six power switches S7–S12 and six diodes D7–D12 connected in a three-phase configuration to three-phase outputs 32a–32c. The outputs 32a–32c are in turn connected to a set of threephase primary windings 34a–34c that are connected together in a delta configuration. The primary windings 34a–34c are magnetically linked to a set of secondary windings 30a-2 through 30c-2 which are coupled in series with the windings 30a-1 through 30c-1, respectively.

The switches S1–S12 receive switch operating signals developed by a switch controller 36. As seen in FIG. 4, the switch controller 36 includes a memory 38 which stores a pulse-width modulated (PWM) control waveform as a series of zeroes and ones. The PWM control waveform is supplied to a three-phase logic circuit 40 which develops a series of six signals, three of which control the switches S1–S6 connected to the phase outputs 26a–26c of the subinverter 22 and the remaining three of which control the switches S7–S12 coupled to the phase outputs 32a–32c of the subinverter 24. These six signals are coupled to a base drive/isolation circuit 42 which derives the twelve switch operating signals for the switches S1–S12. Alternatively, if desired, switch operating signals can be derived by circuitry other than the base drive/isolation circuit 42.

Figure 5:
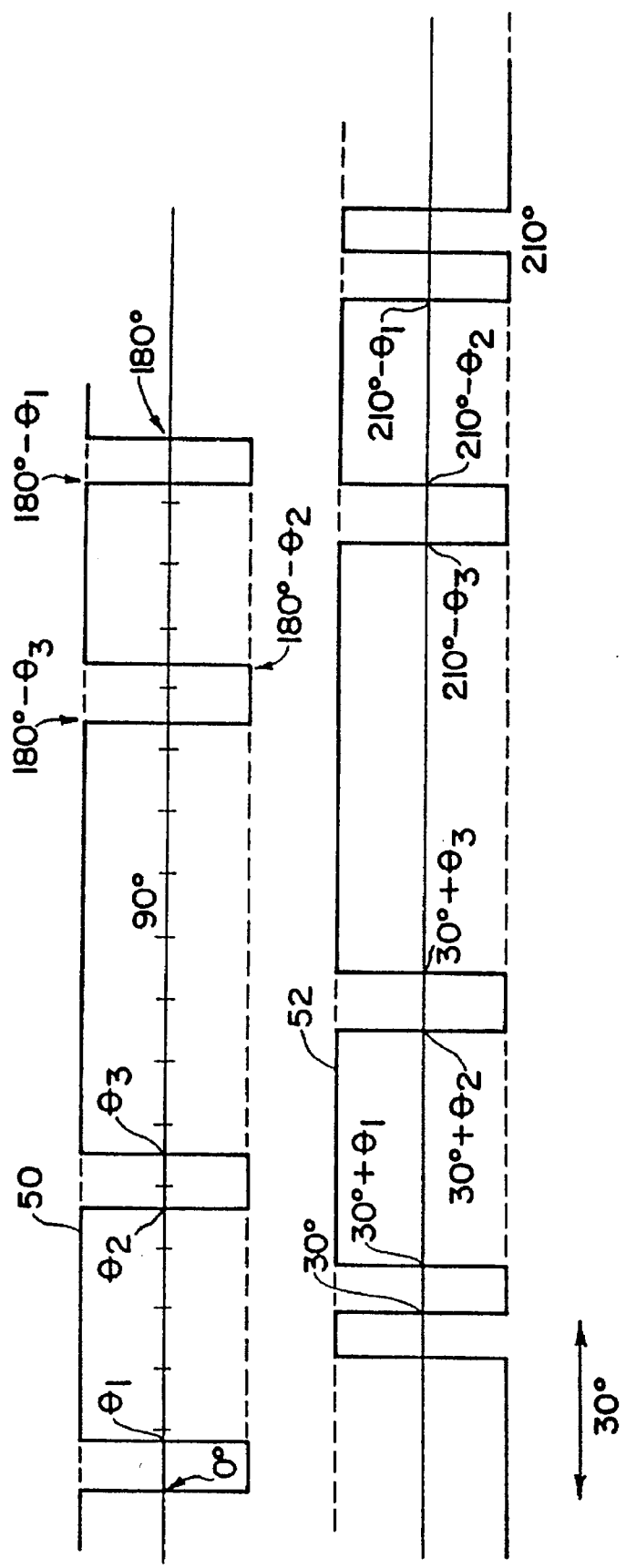
FIG. 5 comprises a waveform diagram illustrating two of the waveforms developed by the threephase logic circuit of FIG. 4.

FIG. 5 illustrates PWM subinverter waveforms 50, 52 produced at the outputs 26a, 32a of the subinverters 22, 24, respectively, referenced to neutral. As seen in FIG. 5, the waveforms 50, 52 are identical except that the waveform 52 is shifted 30° with respect to the waveform 50. As is conventional for three-phase inverters, the waveforms produced at the outputs 26b, 26c are phase displaced 120° and 240°, respectively, relative to the waveform 50. Likewise, the waveforms produced at the outputs 32b, 32c are phase displaced 120° and 240°, respectively, relative to the waveform 52. The transitions between voltage levels by the waveform 50 between 0° and 90° occur at phase angles designated $\theta_1$, $\theta_2$ and $\theta_3$. In the preferred embodiment, the angles $\theta_1$, $\theta_2$ and $\theta_3$ are equal to 7.69°, 49.70° and 54.00°, respectively. The waveforms 50, 52 have quarter-wave symmetry and hence transitions between positive and negative levels in the waveform 50 occur at phase angles equal to 180° minus $\theta_3$, 180° minus $\theta_2$ and 180° minus $\theta_1$. In addition, transitions occur at 0° and 180°.

Figure 6:
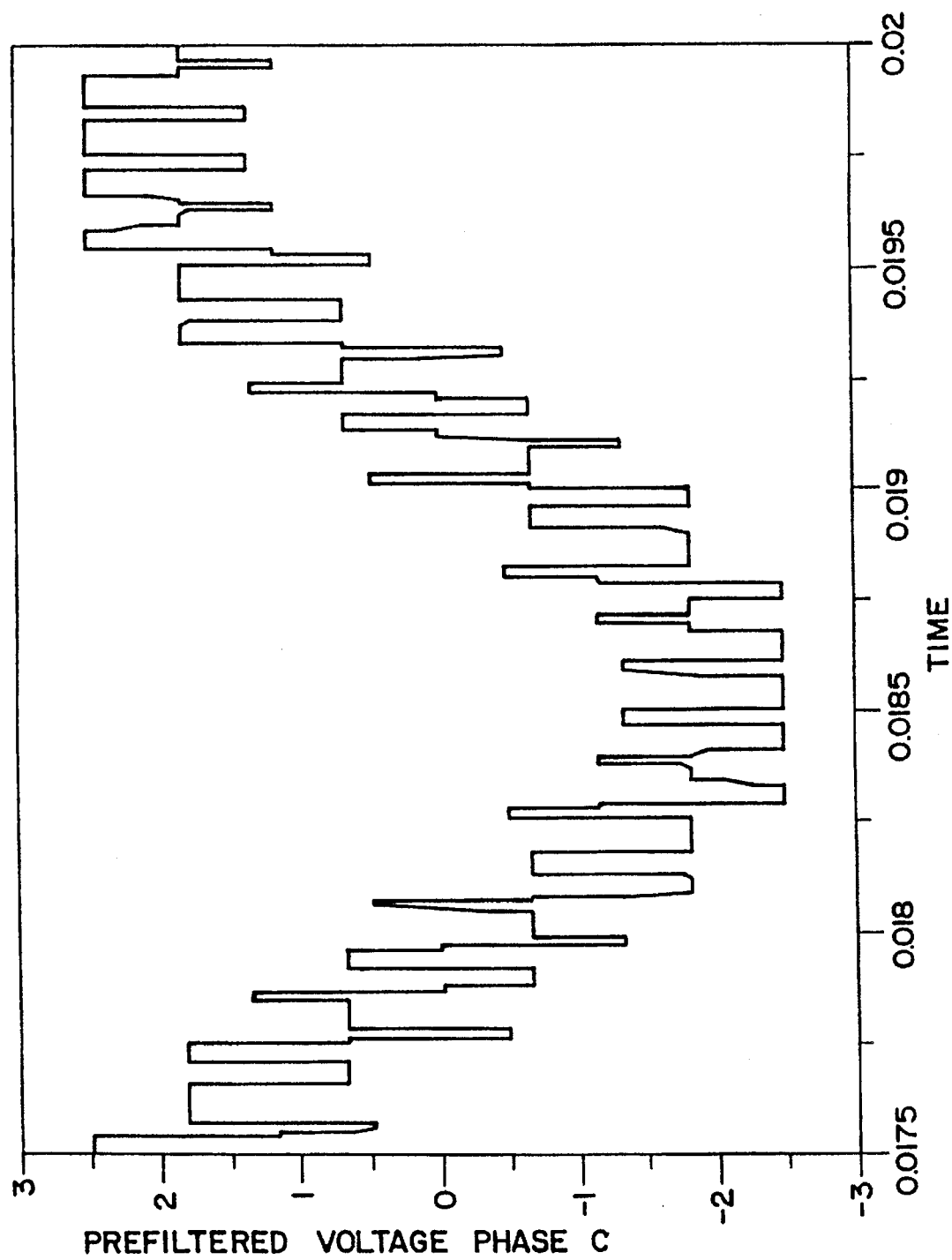
FIG. 6 comprises a waveform diagram illustrating one of the phase outputs of the inverter of FIG. 3.

Phase A through phase C summed voltages are developed across the series-connected secondary windings 30a-1, 30a-2 and 30b-1, 30b-2 and 30c-1, 30c-2, respectively, wherein a portion of one cycle of phase C is shown in FIG. 6. The remaining phase A and phase B voltages developed in the windings 30a, 30b are displaced 120° and 240°, respectively, relative to the phase C waveform of FIG. 6.

In the preferred embodiment, output voltage regulation is accomplished by a voltage regulator 56, FIG. 3, which detects a parameter of the power developed at a point of regulation (POR). In the embodiment illustrated in FIG. 3, the POR is shown between the secondary windings 38a–38c and the output filter 20. It should be noted that the POR may instead be downstream of the output filter 20, if desired. The voltage regulator 56 is preferably responsive to either a phase voltage at the POR or the average of the three-phase voltages at the POR and controls the current delivered to an exciter of the generator 12. This current control in turn regulates the output voltage of the generator 12, and hence the voltage on the DC link 16 and the output voltage of the inverter 18.

FIG. 7 illustrates a modification of the present invention wherein regulation of a output parameter is accomplished by selection of one of a plurality of PWM control waveforms from a memory 60. The regulation scheme shown in FIG. 7 may replace the voltage regulator 56, or may operate in conjunction with the regulator 56, if desired. The magnitude of one of the voltages developed at the POR or the average of the three-phase voltages developed at the POR is provided to an analog-to-digital converter 62 which in turn develops a digital signal that is provided to a summer 64. The summer 64 subtracts the output of the analog-to-digital converter 62 from a reference $V_{ref}$ representing the desired output voltage of the inverter. The resulting error signal is processed by a gain and compensation unit 66 and is applied as an addressing input to the memory 60. In response to addressing of the memory 60, one of the PWM control waveforms stored therein is supplied to the three-phase logic circuit 40.

The PWM control waveforms obtained from the memory 60 vary the magnitude of the fundamental content of the output waveforms from the inverter 18 so that output voltage or current is regulated.

Figure 8:
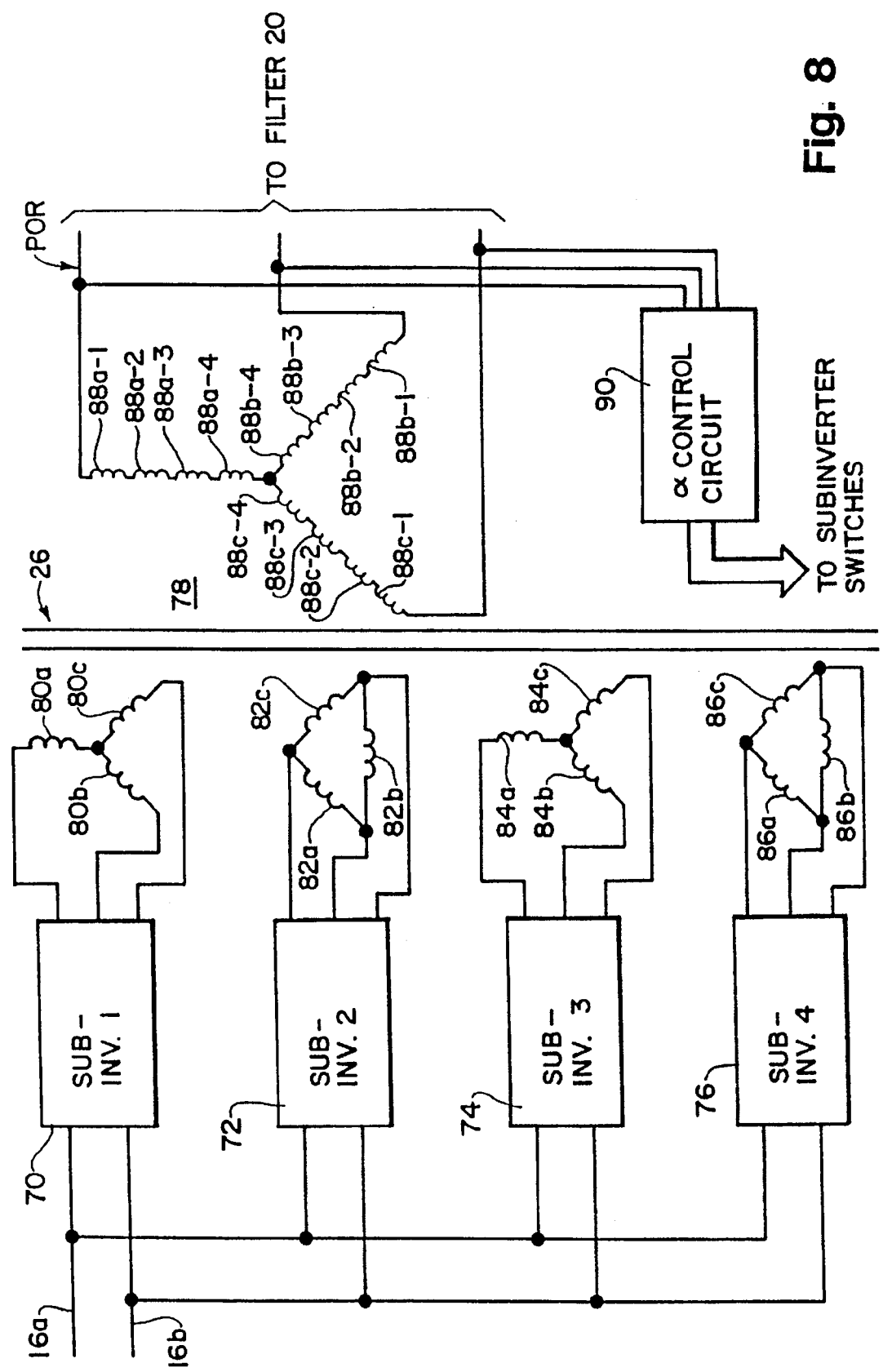
FIG. 8 comprises a combined simplified schematic and block diagram of a further alternative embodiment of the present invention.

FIG. 8 illustrates yet another embodiment of the present invention wherein the two three-phase subinverters are replaced by first through fourth three-phase subinverters 70, 72, 74, 76. In addition, the summing transformer is replaced by a summing transformer 78 having first through fourth sets of three-phase primary windings 80a–80c, 82a–82c, 84a–84c and 86a–86c coupled to the three-phase outputs of the subinverters 70, 72, 74 and 76, respectively. The summing transformer 78 further includes series-connected secondary windings 88a-1 through 88a-4, 88b-1 through 88b-4 and 88c1 through 88c4. As before, three-phase summed voltages are developed across the series-connected secondary windings and are provided to the output filter 20 of FIG. 1.

An alpha control circuit 90 receives the output voltages developed across the secondary windings 88a–88c and develops switch operating signals for controllable switches in the subinverters 70, 72, 74 and 76. It should be noted that each subinverter 70, 72, 74 and 76 is identical to the subinverter 22 illustrated in FIG. 3. The control circuit 90 operates the subinverters 70–76 such that identical waveform are produced thereby except that corresponding phase outputs of the subinverters 70, 72 are phase displaced relative to one another by a first fixed angle, and so that corresponding phase outputs of the subinverters 74, 76 are phase displaced relative to one another by a second fixed angle. In the preferred embodiment, the first and second fixed angles are equal to 30°, although this need not be the case. Further, the waveforms produced by the subinverter 74 are phase displaced relative to the waveforms produced by the subinverter 70 by a variable angle which is controlled by the control circuit 90 in dependence upon the sensed POR voltage. Since the outputs of the inverters 72 and 76 are phase displaced by fixed angles relative to the outputs of the subinverters 70, 74, it follows that the output of the subinverter 76 is phase displaced relative to the output of the subinverter 72 by a variable angle which, in the preferred embodiment, is equal to the angle between the outputs of the subinverters 70, 74.

Figure 9:
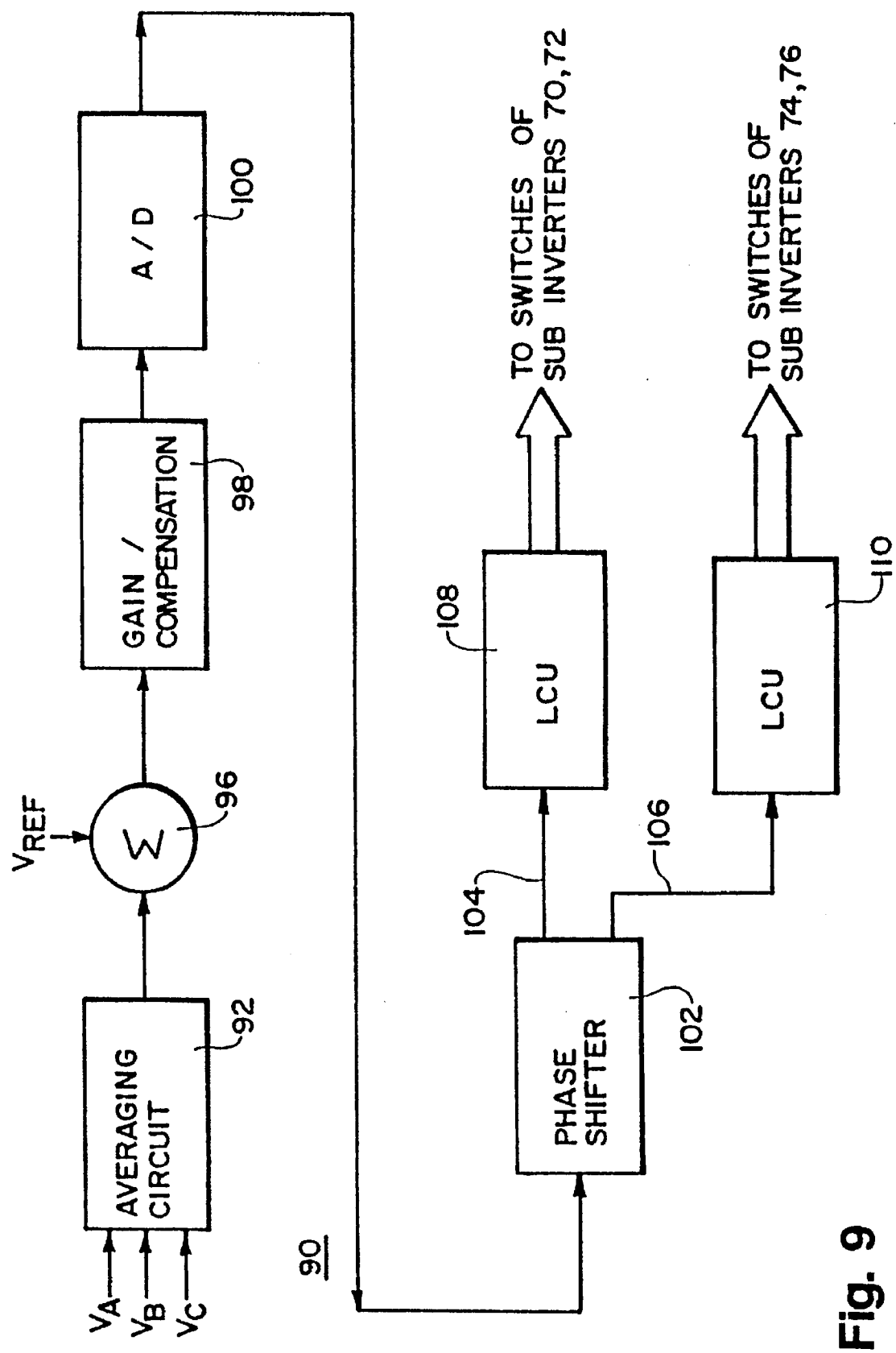
FIG. 9 comprises a block diagram of the alpha control circuit of FIG. 8.

FIG. 9 illustrates the control circuit 90 in greater detail. An averaging circuit 92 receives output voltages $V_A$, $V_B$ and $V_C$ developed across the secondary windings 88a–88c, respectively. The averaging circuit 92 develops a signal representing the average of these voltages and this signal is applied to a first input of a summer 96. The summer 96 subtracts the average signal from a signal $V_{ref}$ representing the desired average output voltage at the POR and the resulting error signal $V_E$ is processed by a gain and compensation unit 98 and an analog/digital (A/D) converter 100. The resulting signal is applied to a phase shifter 102 which develops phase shifted inverter command signals on lines 104, 106. The signals on the lines 104, 106 instruct first and second local control units 108, 110 to develop inverter switch operating signals of proper form and phase displacement.

More particularly, the local control units 108, 110 cause the subinverters 70–76 to develop PWM waveforms, for example as shown in FIG. 5, with the required 120° phase separation between phases of each subinverter output and with the required fixed displacement between the outputs of the subinverters 70, 72 and the subinverters 74, 76. The variable phase displacement between the outputs of the subinverters 70, 74 and 72, 76 is controlled by the control circuit 90 to cause the average inverter output voltage at the POR to approach the regulated value.

It should be noted that a different parameter of the power at the POR may be regulated, such as a single phase voltage, the highest or lowest phase voltage, the average output current or the highest or lowest output current, if desired. Also, the particular form of the control circuit 90 illustrated in FIG. 9 could be replaced by a different type of control circuit that operates the switches in the subinverters 70–76, if desired.

In each of the foregoing embodiments, pulse-width modulated waveforms having phase displacements therebetween and relatively high harmonic content are summed to obtain a stepped waveform having a lower harmonic content. For example, if the subinverters of FIG. 2 were operated in a known fashion (i.e. without pulse-width modulation) to produce summed 12-step AC output power, the lowest order harmonics in the subinverters outputs would be the eleventh and thirteenth. However, by operating the subinverters such that each produces a pulse-width modulated waveform as shown in FIG. 5 having three pulses per half-cycle, the eleventh and thirteenth harmonics are eliminated and the lowest harmonics appearing across the load phases are the twenty-third and twenty-fifth. Further, relatively low harmonic content is obtained using only three pulses per half cycle, and hence reliable switch operation is assured and losses are reduced.

In addition, if the number of steps per half cycle is increased, harmonic content is further reduced. For example, the use of pulse-width modulation at five steps per half cycle in the inverter of FIG. 3 results in a harmonic content order comparable to that produced by a 36-step inverter not utilizing pulse-width modulation. A pulse-width modulation technique utilizing seven steps per half cycle in the inverter of FIG. 3 produces a harmonic content order comparable to that produced by a 48 step inverter not utilizing pulse-width modulation.

The present invention is particularly suited for use in relatively low power applications, for example 10 kilowatt systems or less, although the invention is usable at any power level that can be handled by the power switches.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An inverter for converting DC power into AC power, comprising:

first and second subinverters each having a plurality of controllable switches and three-phase outputs;

a summing transformer having first and second sets of three-phase primary windings and a set of three-phase secondary windings wherein the first set of primary windings is connected in a wye configuration and includes three inputs coupled to the three-phase outputs of the first subinverter and wherein the second set of primary windings is connected in a delta configuration and includes three inputs coupled to the three-phase outputs of the second subinverter; and means coupled to the first and second subinverters for controlling the controllable switches such that the first and second subinverters produce first and second sets of three-phase pulse-width modulated (PWM) subinverter waveforms which are summed by the summing transformer to produce the AC power in the set of secondary windings.

2. The inverter of claim 1 wherein the summing transformer further includes third and fourth sets of three-phase primary windings and further including third ad fourth subinverters each having three-phase outputs coupled to the third and fourth primary windings and producing third and fourth sets of three-phase PWM subinverter waveforms which are summed with the first and second sets of three-phase PWM subinverter waveforms by the the summing transformer.

3. The inverter of claim 2, wherein the first and second sets of three-phase PWM subinverter waveforms are phase displaced relative to one another by a first fixed angle, the third and fourth sets of three-phase PWM subinverter waveforms are phase displaced relative to one another by a second fixed angle and the first and third sets of three-phase PWM subinverter waveforms are phase displaced by a variable angle.

4. The inverter of claim 3, werein the controlling means includes means coupled to the set of secondary windings for sensing an output voltage of the inverter and means for varying the variable angle in dependence upon the sensed output voltage.

5. An inverter for converting DC power into AC power, comprising:
   first and second subinverters each having a controllable switch and an output;
   means coupled to each controllable switch for controlling same such that the first and second subinverters produce first and second pulse-width modulated (PWM) subinverter waveforms wherein the PWM subinverter waveforms are identical except the second is phase displaced relative to the first by a variable angle;
   means for sensing a parameter of the AC power;
   means coupled to the sensing means for controlling the variable angle in dependence upon the sensed parameter; and
   means coupled to the outputs of the subinverters for summing the PWM subinverter waveforms to produce the AC power.

6. The inverter of claim 5, wherein the sensing means comprises means for detecting an output voltage of the inverter.

7. The inverter of claim 5, wherein the summing means comprises a summing transformer having first and second primary windings coupled to the outputs of the first and second subinverters and a secondary winding in which the AC power is produced.

8. An inverter for converting DC power into AC power, comprising:
   first, second, third and fourth subinverters each having a controllable switch and an output;
   a summing transformer having first, second, third and fourth primary windings coupled to the outputs of the first, second, third and fourth subinverters, respectively, and a secondary winding;
   means for producing a pulse-width modulated (PWM) control waveform; and
   means for operating the switch in each subinverter in accordance with the PWM control waveform so that the first through fourth subinverters produce first through fourth pulse-width modulated (PWM) subinverter waveforms which are identical to one another except that the second PWM subinverter waveform is phase displaced relative to the first PWM subinverter waveformby a first fixed angle, the fourth PWM subinverter waveform is phase displaced relative to the third PWM subinverter waveform by a second fixed angle and the third PWM subinverter waveform is phase displaced relative to first PWM subinverter waveform by a variable angle wherein the PWM subinverter waveforms are summed by the summing transformer o produce the AC power in the secondary winding.

9. The inverter of claim 8, further including means for sensing an output voltage of the inverter and wherein the operating means includes means for varying the variable angle in dependence upon the sensed voltage.

10. In a method of operating a three-phase inverter for converting DC power into three-phase AC power wherein the inverter includes first and second subinverters having first and second pluralities of controllable switches, respectively, the controllable switches of each of the first and second pluralities being connected in a three-phase bridge configuration and producing first, second and third subinverter phase outputs, the improvement comprising the steps of:
   providing a summing transformer having first and second sets of primary windings and a set of secondary windings wherein each set of windings includes first, second and third phase windings, the first, second and third phase windings of each set of primary windings receiving the first, second and third subinverter phase outputs of one of the subinverters, respectively, and the first phase winding of the set of secondary windings summing the first subinverter phase output of one of the subinverters with the first subinverter phase output of the other subinverter, the second phase winding of the set of secondary windings summing the second subinverter phase output of one of the subinverters with the second subinverter phase output of the other subinverter and the third phase winding of the set of secondary windings summing the third subinverter phase output of one of the subinverters with the third subinverter phase output of the other subinverter, respectively;
   producing a pulse-width modulated (PWM) control waveform;
   deriving first and second pluralities of PWM switch operating waveforms from the PWM control waveform; and
   operating the first and second pluralities of controllable switches in the subinverters in accordance with the first and second pluralities of PWM switch operating waveforms so that the subinverter phase outputs are pulse-width modulated and are summed by the summing transformer to produce the three-phase AC power.

11. The improvement of claim 10, including the further step of regulating a parameter of the three-phase AC power.

12. The improvement of claim 11, wherein the step of regulating includes-the step of controlling a parameter of the DC power.

13. The improvement of claim 11, wherein the step of regulating includes the step of sensing an output voltage produced by the inverter and controlling a DC voltage provided to the inverter in dependence upon the sensed output voltage.

14. The improvement of claim 11, wherein the switches of the subinverters are operated such that the PWM output waveforms are identical but phase displaced relative to each other.

15. The improvement of claim 11, wherein the step of producing includes the steps of providing a memory storing multiple PWM control waveforms, sensing an output voltage produced by the inverter and selecting a particular PWM control waveform from the memory in dependence upon the sensed output voltage.

* * * * *